(12) United States Patent
Liu et al.

(10) Patent No.: US 12,052,202 B2
(45) Date of Patent: Jul. 30, 2024

(54) SIDELINK SYNCHRONIZATION SIGNAL BLOCK PRIORITY

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/649,757

(22) Filed: Feb. 2, 2022

(65) Prior Publication Data

US 2023/0246790 A1 Aug. 3, 2023

(51) Int. Cl.
*H04L 5/00* (2006.01)
*H04W 28/26* (2009.01)

(52) U.S. Cl.
CPC .......... *H04L 5/0064* (2013.01); *H04L 5/0051* (2013.01); *H04W 28/26* (2013.01)

(58) Field of Classification Search
CPC .... H04W 28/26; H04W 72/51; H04L 5/0051; H04L 5/0048; H04L 5/005; H04L 5/0058; H04L 5/0069; H04L 5/0073; H04L 5/0075; H04L 5/0076; H04L 5/0064
See application file for complete search history.

(56) References Cited

U.S. PATENT DOCUMENTS

| | | | | |
|---|---|---|---|---|
| 2020/0053798 A1* | 2/2020 | Tsai | ................... | H04W 74/0833 |
| 2021/0007149 A1* | 1/2021 | Li | ........................ | H04L 27/0006 |
| 2022/0183049 A1* | 6/2022 | Lee | ........................ | H04W 76/20 |
| 2023/0064680 A1* | 3/2023 | Huang | ................. | H04L 1/1848 |
| 2023/0164833 A1* | 5/2023 | Kusashima | ........... | H04W 16/14 |
| | | | | 370/329 |

FOREIGN PATENT DOCUMENTS

| | | | | | |
|---|---|---|---|---|---|
| CN | 115175296 | | * | 4/2021 | |
| CN | 115175296 | A | * | 10/2022 | |
| EP | 4152793 | A1 | | 3/2023 | |
| WO | WO 2020032698 | A1 | * | 2/2020 | .......... H04W 72/569 |
| WO | WO-2021181336 | A1 | * | 9/2021 | ............ H04W 16/28 |
| WO | WO-2021230021 | A1 | | 11/2021 | |
| WO | WO 2023082356 | A1 | * | 11/2021 | |
| WO | WO 2023037004 | A1 | * | 9/2022 | ........ H04W 74/0808 |
| WO | WO-2023037004 | A1 | * | 3/2023 | |
| WO | WO-2023082356 | A1 | * | 5/2023 | |

OTHER PUBLICATIONS

International Search Report and Written Opinion—PCT/US2023/060317—ISA/EPO—Apr. 11, 2023.

* cited by examiner

*Primary Examiner* — Phong La

(74) *Attorney, Agent, or Firm* — Harrity & Harrity, LLP

(57) ABSTRACT

Various aspects of the present disclosure generally relate to wireless communication. In some aspects, a user equipment (UE) may transmit a sidelink synchronization signal block (S-SSB) with a high priority listen-before-talk (LBT) parameter. The UE may communicate with an other UE based at least in part on the S-SSB with the high priority LBT parameter. Numerous other aspects are described.

30 Claims, 13 Drawing Sheets

SIDELINK SYNCHRONIZATION SIGNAL BLOCK PRIORITY

FIELD OF THE DISCLOSURE

Aspects of the present disclosure generally relate to wireless communication and to techniques and apparatuses for sidelink synchronization signal block priority.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting a sidelink synchronization signal block (S-SSB) with a high priority listen-before-talk (LBT) parameter. The method may include communicating with an other UE based at least in part on the S-SSB with the high priority LBT parameter.

Some aspects described herein relate to a method of wireless communication performed by a UE. The method may include transmitting an indication of a periodic reservation for S-SSB transmissions. The method may include communicating with an other UE based at least in part on the periodic reservation.

Some aspects described herein relate to an apparatus for wireless communication performed by a UE. The apparatus may include a memory and one or more processors, coupled to the memory. The one or more processors may be configured to transmit an S-SSB with a high priority LBT parameter. The one or more processors may be configured to communicate with an other UE based at least in part on the S-SSB with the high priority LBT parameter.

Some aspects described herein relate to an apparatus for wireless communication performed by a UE. The apparatus may include a memory and one or more processors, coupled to the memory. The one or more processors may be configured to transmit an indication of a periodic reservation for S-SSB transmissions. The one or more processors may be configured to communicate with an other UE based at least in part on the periodic reservation.

Some aspects described herein relate to a non-transitory computer-readable medium that stores a set of instructions for wireless communication by a UE. The set of instructions, when executed by one or more processors of the UE, may cause the UE to transmit an S-SSB with a high priority LBT parameter. The set of instructions, when executed by one or more processors of the UE, may cause the UE to communicate with an other UE based at least in part on the S-SSB with the high priority LBT parameter.

Some aspects described herein relate to a non-transitory computer-readable medium that stores a set of instructions for wireless communication by a UE. The set of instructions, when executed by one or more processors of the UE, may cause the UE to transmit an indication of a periodic reservation for S-SSB transmissions. The set of instructions, when executed by one or more processors of the UE, may cause the UE to communicate with an other UE based at least in part on the periodic reservation.

Some aspects described herein relate to an apparatus for wireless communication. The apparatus may include means for transmitting an S-SSB with a high priority LBT parameter. The apparatus may include means for communicating with a UE based at least in part on the S-SSB with the high priority LBT parameter.

Some aspects described herein relate to an apparatus for wireless communication. The apparatus may include means for transmitting an indication of a periodic reservation for S-SSB transmissions. The apparatus may include means for communicating with a UE based at least in part on the periodic reservation.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
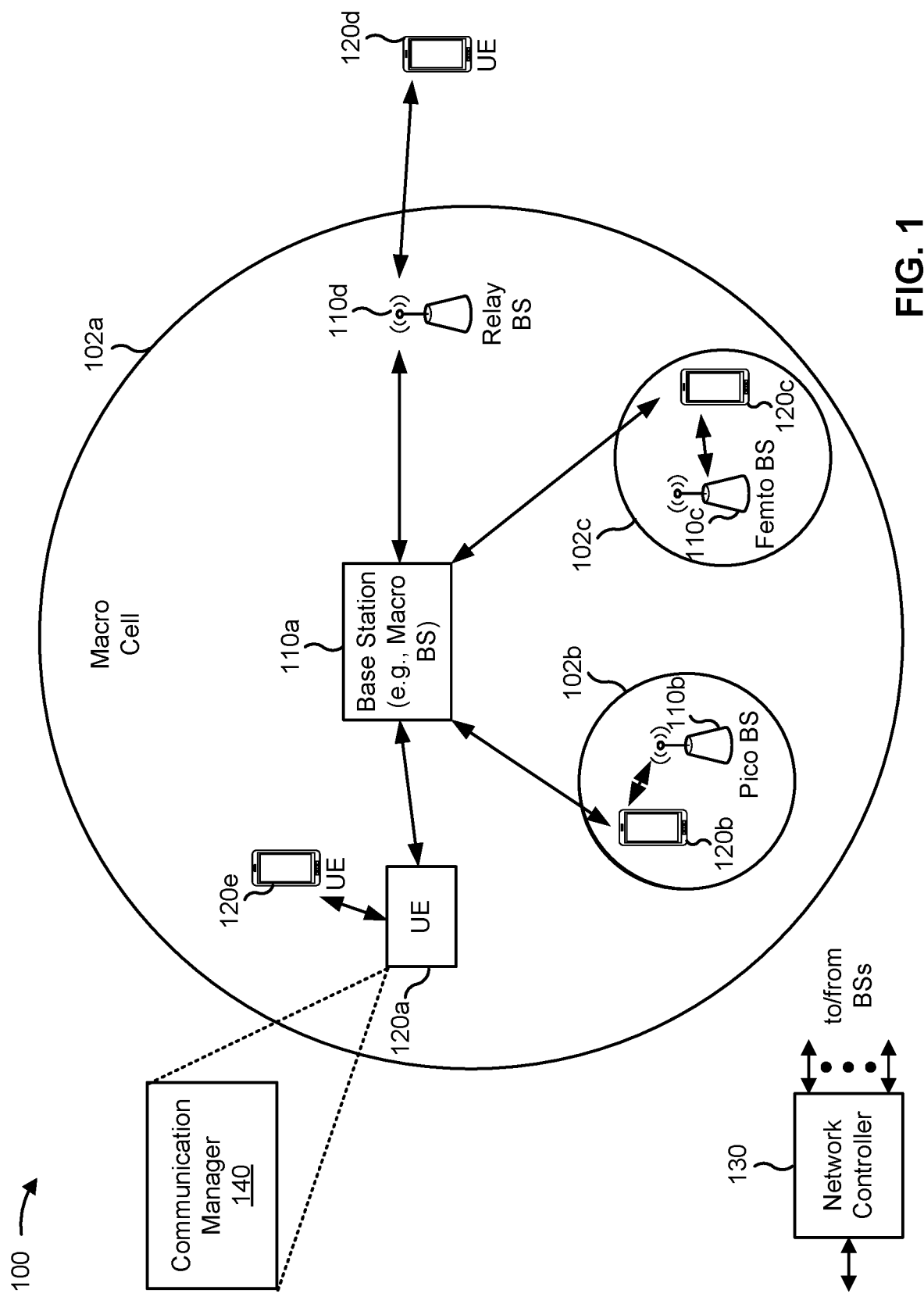
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120

(shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit a sidelink synchronization signal block (S-SSB) with a high priority listen-before-talk (LBT) parameter; and communicate with an other UE based at least in part on the S-SSB with the high priority LBT parameter. Additionally, or alternatively, the communication manager 140 may perform one or more other operations described herein.

In some aspects, the UE 120 may include a communication manager 140. As described in more detail elsewhere herein, the communication manager 140 may transmit an indication of a periodic reservation for S-SSB transmissions; and communicate with an other UE based at least in part on the periodic reservation. Additionally, or alternatively, the communication manager 140 may perform one or more other operations described herein.

As indicated above, FIG. 1 is provided as an example. Other examples may differ from what is described with regard to FIG. 1.

Figure 2:
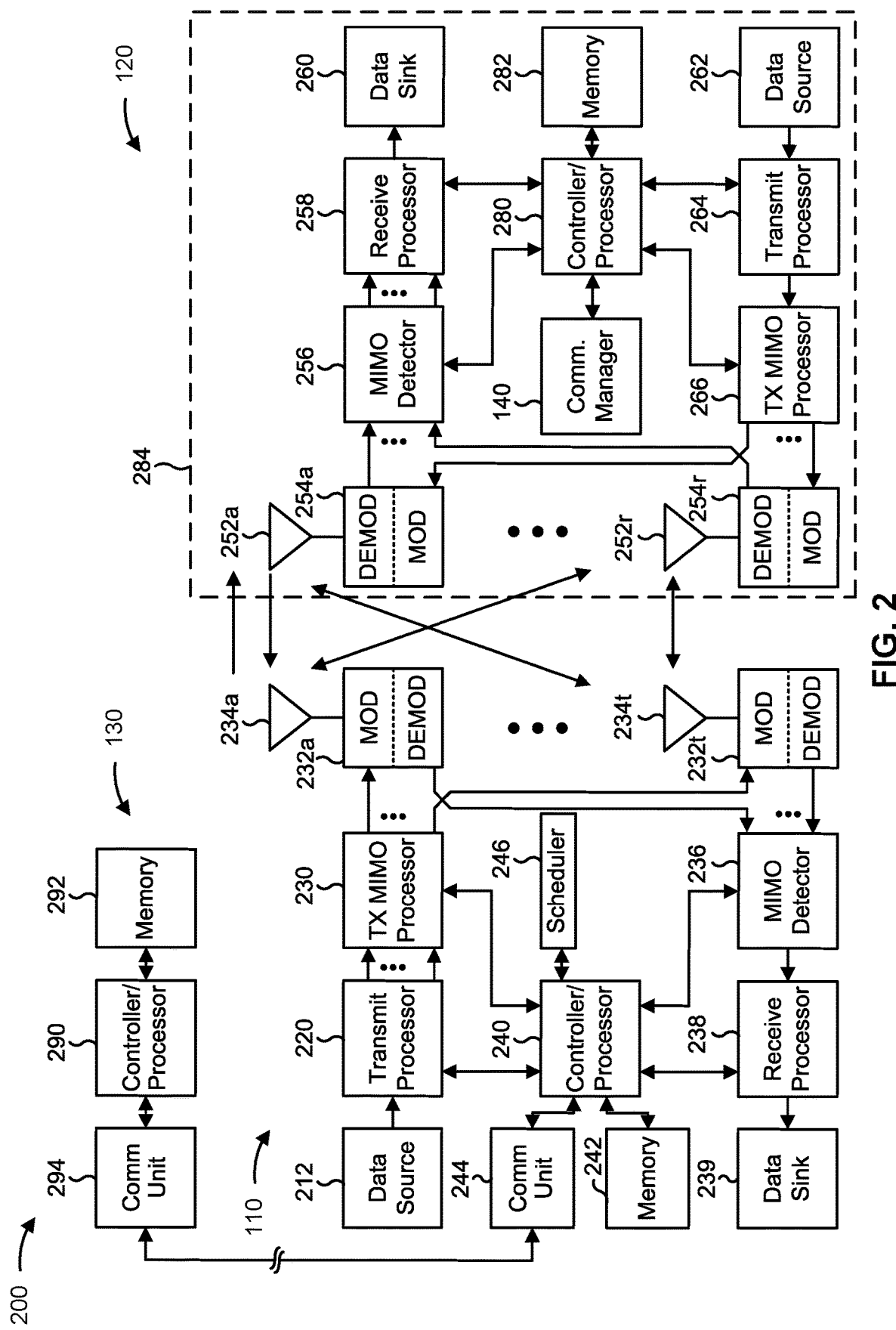
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-13).

The controller/processor 240 of the base station 110, the controller/processor 280 of the UE 120, and/or any other component(s) of FIG. 2 may perform one or more techniques associated with S-SSB priority, as described in more detail elsewhere herein. For example, the controller/processor 240 of the base station 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for transmitting an S-SSB with a high priority LBT parameter; and/or means for communicating with an other UE based at least in part on the S-SSB with the high priority LBT parameter. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for transmitting an indication of a periodic reservation for S-SSB transmissions; and/or means for communicating with an other UE based at least in part on the periodic reservation. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
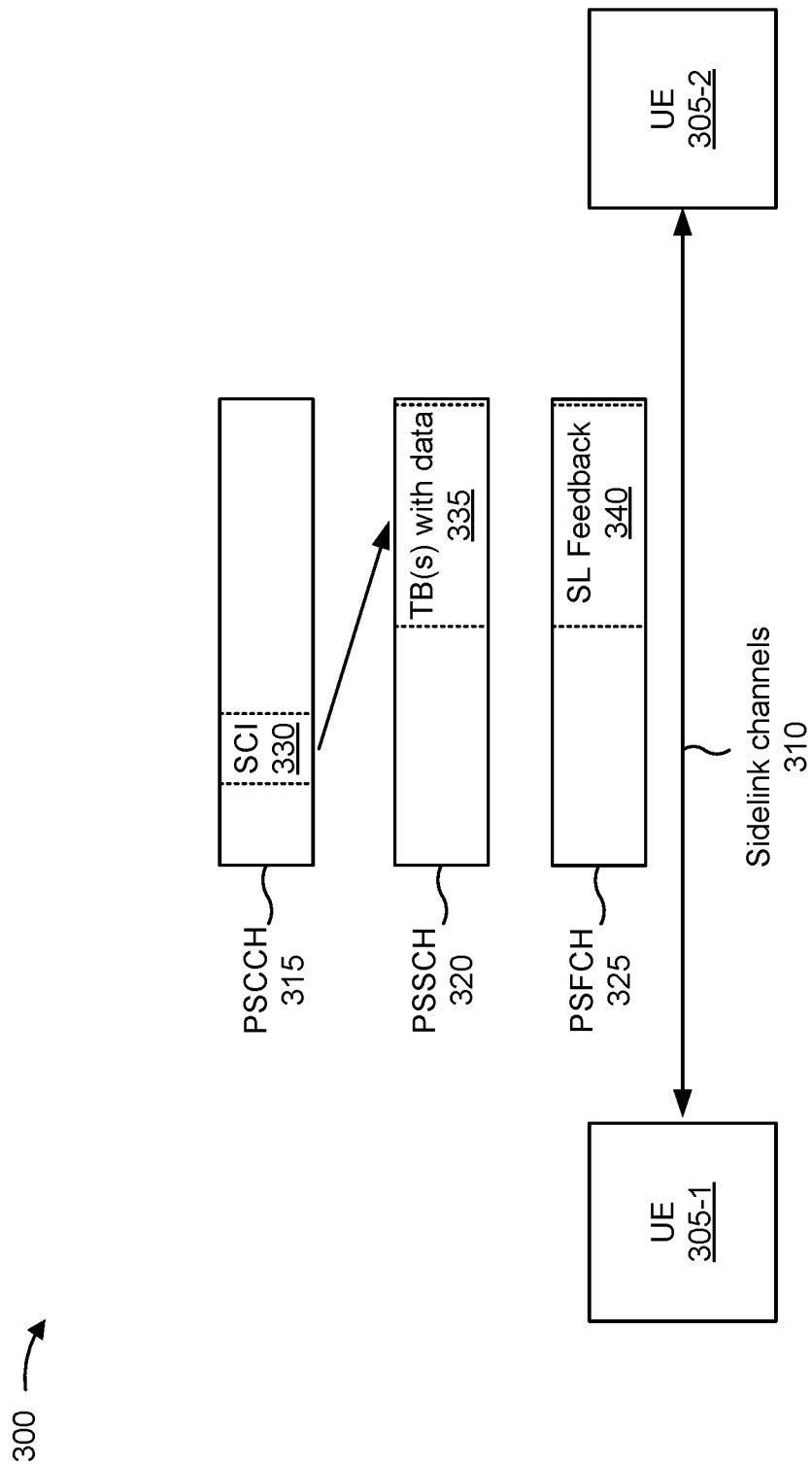
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 320, such as a HARQ process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As described in more detail herein, the UE 305-1 or UE 305-2 may be configured to perform high priority S-SSB transmissions or S-SSB reservations using the sidelink channels 310.

As indicated above, FIG. 3 is provided as an example. Other examples may differ from what is described with respect to FIG. 3.

Figure 4:
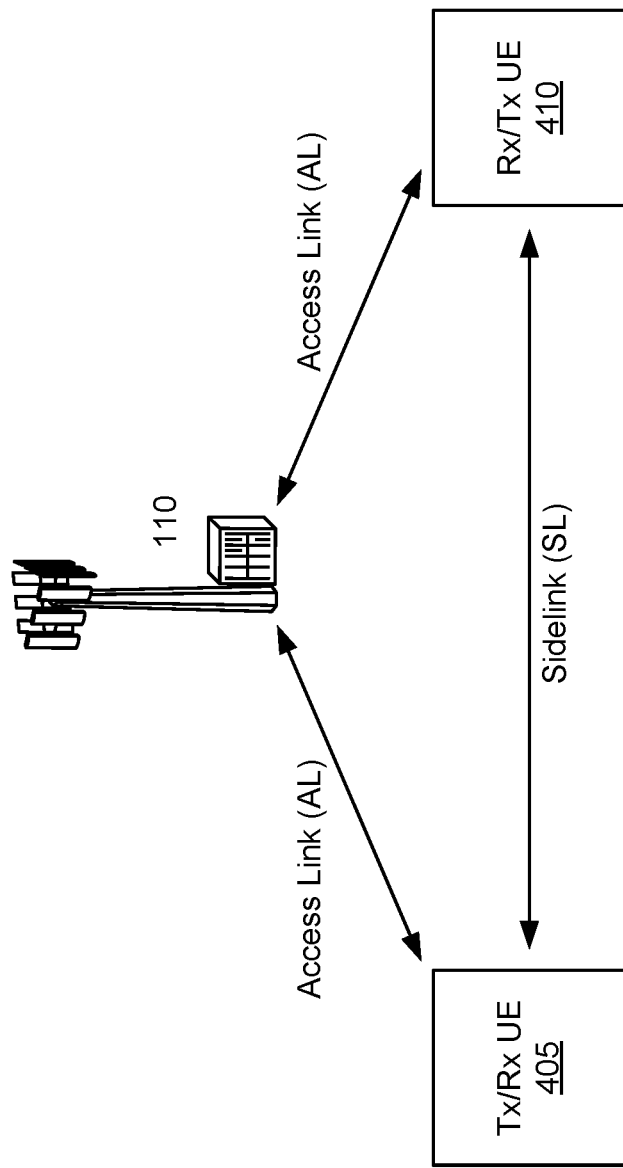
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As described in more detail herein, the UE 405 or UE 410 may be configured to perform high priority S-SSB transmissions or S-SSB reservations for the sidelink communications.

As indicated above, FIG. 4 is provided as an example. Other examples may differ from what is described with respect to FIG. 4.

Figure 5:
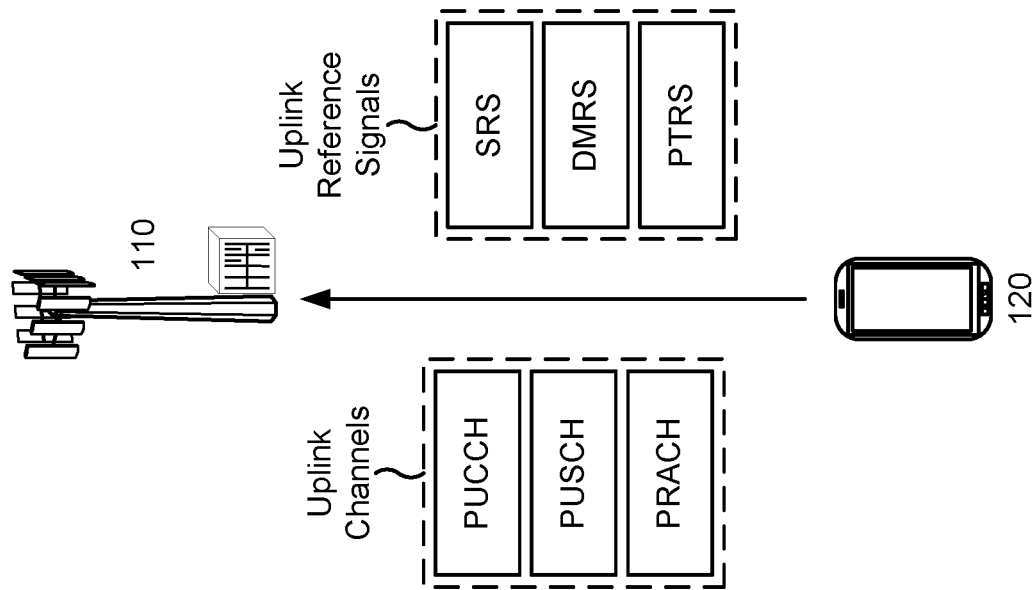
FIG. 5 is a diagram illustrating an example of physical channels and reference signals in a wireless network, in accordance with the present disclosure.
Figure 5:
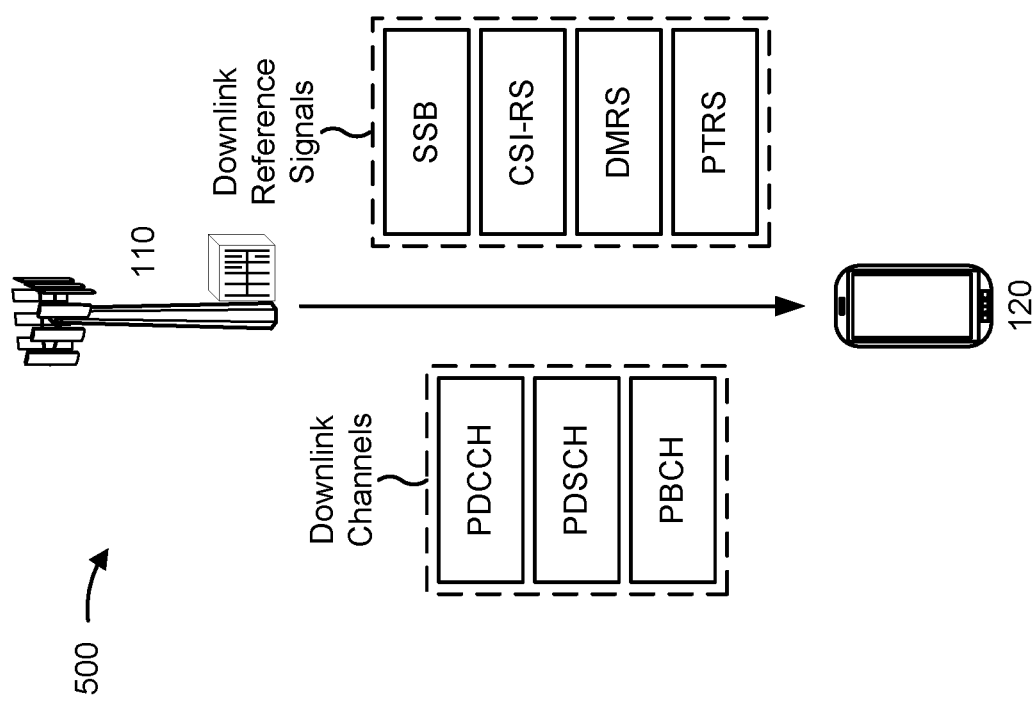

FIG. 5 is a diagram illustrating an example 500 of physical channels and reference signals in a wireless network, in accordance with the present disclosure. As shown in FIG. 5, downlink channels and downlink reference signals may carry information from a base station 110 to a UE 120, and uplink channels and uplink reference signals may carry information from a UE 120 to a base station 110.

As shown, a downlink channel may include a PDCCH that carries DCI, a PDSCH that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a PUSCH that carries uplink data, or a physical random access channel (PRACH) used for initial network access, among other examples. In some aspects, the UE 120 may transmit ACK or NACK feedback (e.g., ACK/NACK feedback or ACK/NACK information) in UCI on the PUCCH and/or the PUSCH.

As further shown, a downlink reference signal may include a synchronization signal block (SSB), a CSI reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error. As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As described in more detail herein, the UE 120 may be configured to perform high priority S-SSB transmissions or S-SSB reservations for the sidelink communications.

As indicated above, FIG. 5 is provided as an example. Other examples may differ from what is described with regard to FIG. 5.

Figure 6:
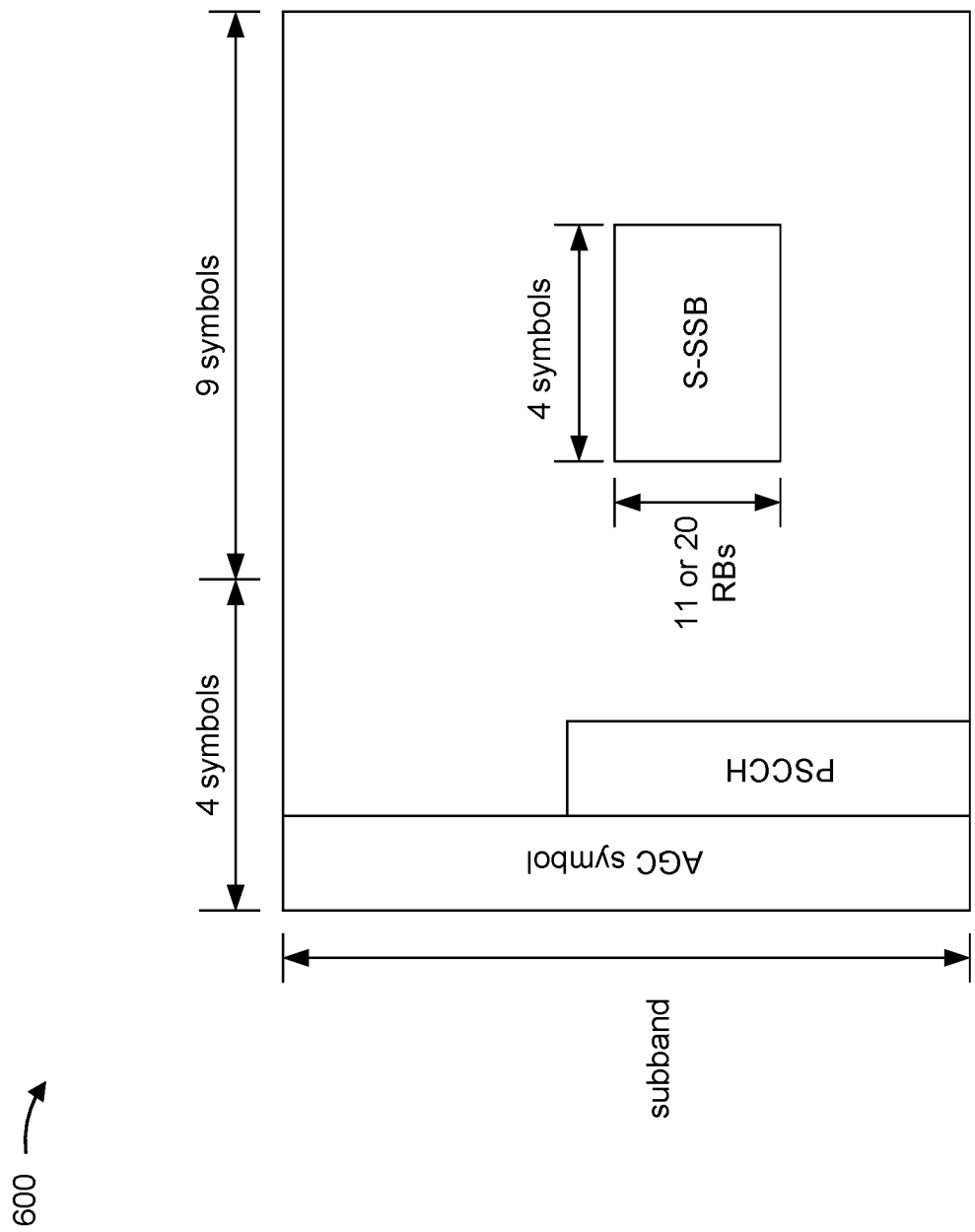
FIG. 6 is a diagram illustrating an example of a sidelink synchronization signal block (S-SSB), in accordance with the present disclosure.

FIG. 6 is a diagram illustrating an example 600 of a sidelink synchronization signal block, in accordance with the present disclosure.

In some aspects, the SSB, such as described in connection with the example 500, may be implemented in sidelink communications, such as the sidelink communications described in connection with the examples 300 and 400. In this case, the SSB may be referred to as an S-SSB.

As shown in the example 600, the S-SSB may be integrated with the PSCCH and/or the PSSCH an in integrated waveform. In this example, the PSCCH may be multiplexed (e.g., using time division multiplexing (TDM) and/or frequency division multiplexing (FDM)) with the PSSCH. In some cases, the PSCCH may be located in the first four symbols of the PSSCH. For example, the first symbol may be an automatic gain control (AGC) symbol, the second, third, and fourth symbols may carry two or three symbols for the PSCCH.

In some aspects, the S-SSB pattern may be designed as a four symbol structure, as shown in the example 600. For example, the S-SSB may include four symbols and eleven or twenty resource blocks, among other examples. In some aspects, the S-SSB may be in the later part of the PSCCH/PSSCH. The S-SSB may not collide with the PSCCH, but the PSSCH may rate match around the S-SSB. For example, sidelink control information (e.g., SCI-1 or SCI-2) may indicate the PSSCH rate matching behavior around the S-SSB so that the PSSCH receiver, that is unaware of the S-SSB presence, may still be able to determine how to perform the decoding.

As described herein, the S-SSB may be of high importance. For example, the S-SSB may be the first step (or an otherwise important step) for one sidelink UE 120 (e.g., a receiver UE 120) to discover another sidelink UE 120 (e.g., a transmitter UE 120). The S-SSB may need to be given a high priority and protection in the presence of the same RAT, or another RAT (e.g., Wi-Fi or Bluetooth communications). Additionally, the PSCCH and PSSCH may be transmitted together with the S-SSB, and may also need to be given higher priority, which may provide higher quality discovery signal transmissions, and may provide some fundamental parameters for the operation of the transmitter UE 120 (e.g., remaining minimum system information (RMSI) and/or system information block (SIB) information). Without this higher priority and protection, the receiver UE 120 may be less likely to detect the S-SSB signal and may therefore be less likely to discover the transmitter UE 120.

Techniques and apparatuses are described herein for S-SSB priority. In some aspects, a first UE 120 may transmit an S-SSB with a high priority LBT parameter, and the first UE 120 may communicate with a second UE 120 based at least in part on the S-SSB with the high priority LBT parameter. In one example, the high priority LBT parameter may be associated with a highest priority of the PSSCH that carries the S-SSB. In another example, S-SSB may be transmitted using the highest channel access priority class (CAPC) that is available for S-SSB transmissions. In another example, the S-SSB may be transmitted in a PSCCH that occupies an earliest contention slot or offset of the PSSCH (e.g., if a cyclic prefix extension precedes the PSSCH). In some aspects, the first UE 120 may transmit an indication of a periodic reservation for the S-SSB transmissions, and the first UE 120 may communicate with the second UE 120 based at least in part on the periodic reservation.

As described above, detection of the S-SSB may be an important step for the second UE 120 to discover the first UE 120. If the S-SSB is not given a high priority and protection, the second UE 120 may be less likely to detect the S-SSB signal and may therefore be less likely to discover the first UE 120. Using the techniques and apparatuses described herein, the S-SSB may be given a high priority and protection in order to improve sidelink communications. This may be particularly beneficial if all of the nodes (e.g., UEs 120) in the system are using the same RAT that has the capability to understand and honor the S-SSB reservations.

As indicated above, FIG. 6 is provided as an example. Other examples may differ from what is described with regard to FIG. 6.

Figure 7:
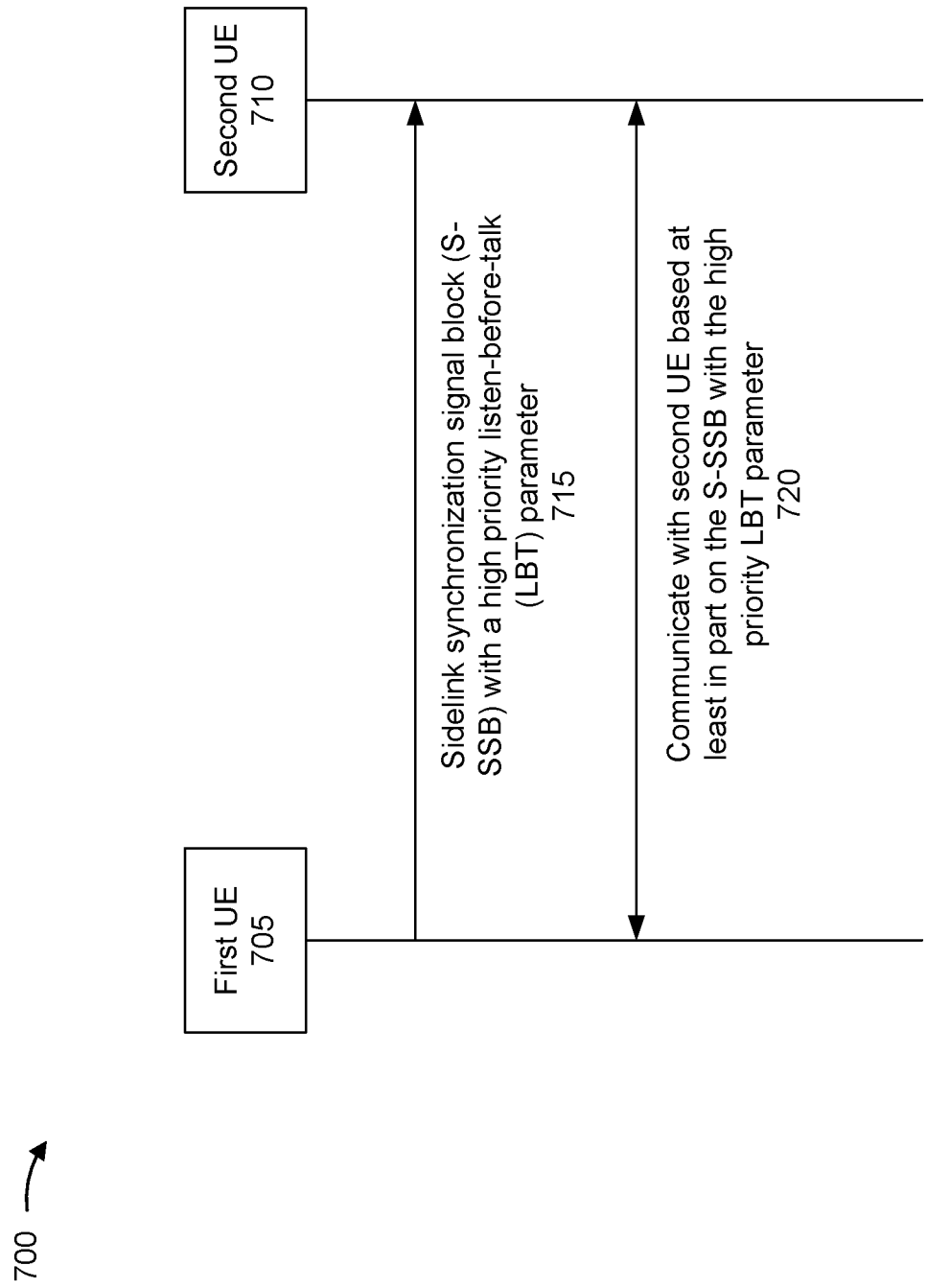
FIG. 7 is a diagram illustrating an example associated with S-SSB priority, in accordance with the present disclosure.

FIG. 7 is a diagram illustrating an example 700 of S-SSB priority, in accordance with the present disclosure. A UE, such as the first UE 705, may communicate with another UE, such as the second UE 710. The first UE 705 and the second UE 710 may communicate via sidelink communications. The first UE 705 and/or the second UE 710 may include some or all of the features of the UE 120 described above.

As shown in connection with reference number 715, the first UE 705 may transmit, and the second UE 710 may receive, an S-SSB with a high priority LBT parameter.

In some aspects (e.g., in a shared or unlicensed frequency band), the UE 705 may contend against other devices for channel access before transmitting on a shared or unlicensed channel to reduce and/or prevent collisions on the shared or unlicensed channel. To contend for channel access, the UE 705 may perform a channel access procedure, such as an LBT procedure or another type of channel access procedure. The channel access procedure may be performed to determine whether the physical channel (e.g., the radio resources of the channel) are free to use or are busy (e.g., in use by another wireless communication device such as a UE, an IoT device, or a wireless local area network (WLAN) device, among other examples). The channel access procedure may include sensing or measuring the physical channel (e.g., performing a reference signal received power (RSRP) measurement, detecting an energy level, or performing another type of measurement) during a channel access gap (which may also be referred to as a contention window (CW)) and determining whether the shared or unlicensed channel is free or busy based at least in part on the signals sensed or measured on the physical channel (e.g., based at least in part on whether the measurement satisfies a threshold). If the UE 705 determines that the channel access procedure was successful, the UE 705 may perform one or more transmissions on the shared or unlicensed channel during a transmission opportunity (TXOP), which may extend for a channel occupancy time (COT).

In some aspects, the UE 705 may transmit the S-SSB using a high priority of the PSSCH. The priority of the PSSCH may be based at least in part on the priorities described in Release 16 of the 3GPP standards. For example, the priority of the PSSCH may be defined as in Release 16 of the 3GPP standards for the channel usage radio (CR) and CBR mechanisms.

In some aspects, the UE 705 may transmit the S-SSB using a high priority PSSCH, such as a PSSCH having the highest priority described in Release 16 of the 3GPP standards. In some aspects, the UE 705 may transmit the S-SSB using a priority that is higher than the highest priority PSSCH. For example, a priority may be defined for the PSSCH and S-SSB transmissions that is higher than the highest priority of the PSSCH described in Release 16 of the 3GPP standards. The S-SSB and PSSCH may be transmitted using the priority that is higher than the highest priority PSSCH.

In some aspects, the S-SSB may be transmitted based at least in part on an LBT category. The LBT category may define a channel sensing duration during which the first UE 705 performs a clear channel access (CCA) procedure. The channel sensing duration may indicate a length of time during which the first UE 705 detects or senses an energy level on the channel to determine whether the energy level is less than (or equal to) a threshold. If the energy level is less than (or equal to) the threshold, then the LBT/CCA procedure is successful, and the first UE 705 may transmit a communication. If the energy level is greater than (or equal to) the threshold, then the CCA procedure is unsuccessful and the first UE 705 may wait for a period of time (e.g., a backoff duration) before performing the CCA procedure again.

In some aspects, example LBT categories include category one (Cat 1) LBT, category two (Cat 2) LBT, category three (Cat 3) LBT, and category four (Cat 4) LBT. In Cat 1 LBT, also referred to as no LBT, an LBT procedure is not performed prior to transmission of a communication on the channel. In Cat 2 LBT, the channel sensing duration is fixed (e.g., without random back-off). For example, a 16 microsecond channel sensing duration is used for 16 microsecond Cat 2 LBT, and a 25 microsecond channel sensing duration is used for 25 microsecond Cat 2 LBT. In Cat 3 LBT, the channel sensing duration is fixed (e.g., a contention window has a fixed size), and random back-off is used. In Cat 4 LBT, the channel sensing duration is variable (e.g., a contention window has a variable size), and random back-off is used.

In Cat 4 LBT, the channel sensing duration may be variable depending on whether the first UE 705 senses interference (e.g., an energy level greater than or equal to a threshold). Using a Cat 4 LBT procedure, the first UE 705 may select a minimum channel sensing duration, which may be defined by a CAPC associated with the Cat 4 LBT procedure being used by the first UE 705. For example, four different CAPCs may be associated with Cat 4 LBT, with the lowest CAPC value (e.g., CAPC 0) being associated with the highest priority for Cat 4 LBT (e.g., the shortest contention window size and shortest back-off duration), and the highest CAPC value (e.g., CAPC 3) being associated with the lowest priority for Cat 4 LBT (e.g., the longest contention window size and longest back-off duration). Generally, a higher CAPC value (e.g., a higher CAPC index) is associated with a lower priority. In Cat 4 LBT, if the first UE 705 detects interference in the minimum channel sensing duration for a CCA procedure as defined by a CAPC for the Cat 4 LBT procedure, then the first UE 705 may increase the channel sensing duration for the next CCA procedure.

In some aspects, the first UE 705 may transmit the S-SSB using a Cat 1 LBT procedure. For example, the first UE 705 may transmit the S-SSB without using an LBT procedure prior to a transmission on the channel.

In some aspects, the first UE 705 may transmit the S-SSB using a Cat 2 LBT procedure (e.g., a one-shot LBT procedure). In some aspects, considering the low duty cycle of S-SSB transmissions (e.g., having a periodicity of 160 milliseconds (ms)), the first UE 705 may transmit the S-SSB using the Cat 2 LBT if the duty cycle is less than (or less than or equal to) 1/20. In some aspects, the PSSCH (e.g., the multiplexed PSSCH) may need to carry non-unicast data in addition to the S-SSB.

In some aspects, the first UE 705 may transmit the S-SSB using a Cat 4 LBT procedure. For example, the UE 705 may transmit the S-SSB using the highest available CAPC for S-SSB transmissions. In some aspects, the S-SSB may be transmitted using a smallest contention window that is available in the Cat 4 LBT procedure.

In some aspects, a cyclic prefix extension may be used before the PSSCH and PSCCH transmission. When the cyclic prefix extension is used, the PSCCH that carries the S-SSB may be able to use (e.g., occupy) the earliest contention slot or offset of the PSSCH. Thus, the first UE 705 may have the opportunity to access the channel earlier (e.g., prior to other nodes) and to block communications by other nodes that selected later starting points. Additional details regarding these features are described below in connection with FIG. 9.

As shown in connection with reference number 720, the first UE 705 and the second UE 710 may communicate based at least in part on the S-SSB with the high priority LBT parameter. For example, the second UE 710 may detect the S-SSB with the high priority LBT parameter, and the first UE 705 may be able to communicate with the second UE 710 at an early time frame. For example, the first UE 705 may be able to communicate with the second UE 710 prior to other nodes in the system having lower priorities.

As described above, detection of the S-SSB may be an important step for the second UE 710 to discover the first UE 705. If the S-SSB is not given a high priority and protection, the second UE 710 may be less likely to detect the S-SSB signal, and may therefore be less likely to discover the first UE 705. Using the techniques and apparatuses described herein, the S-SSB may be given a high priority and protection in order to improve sidelink communications. This may be particularly beneficial if all of the nodes (e.g., UEs) in the system are using the same RAT that has the capability to understand and honor the S-SSB reservations.

As indicated above, FIG. 7 is provided as an example. Other examples may differ from what is described with regard to FIG. 7.

Figure 8:
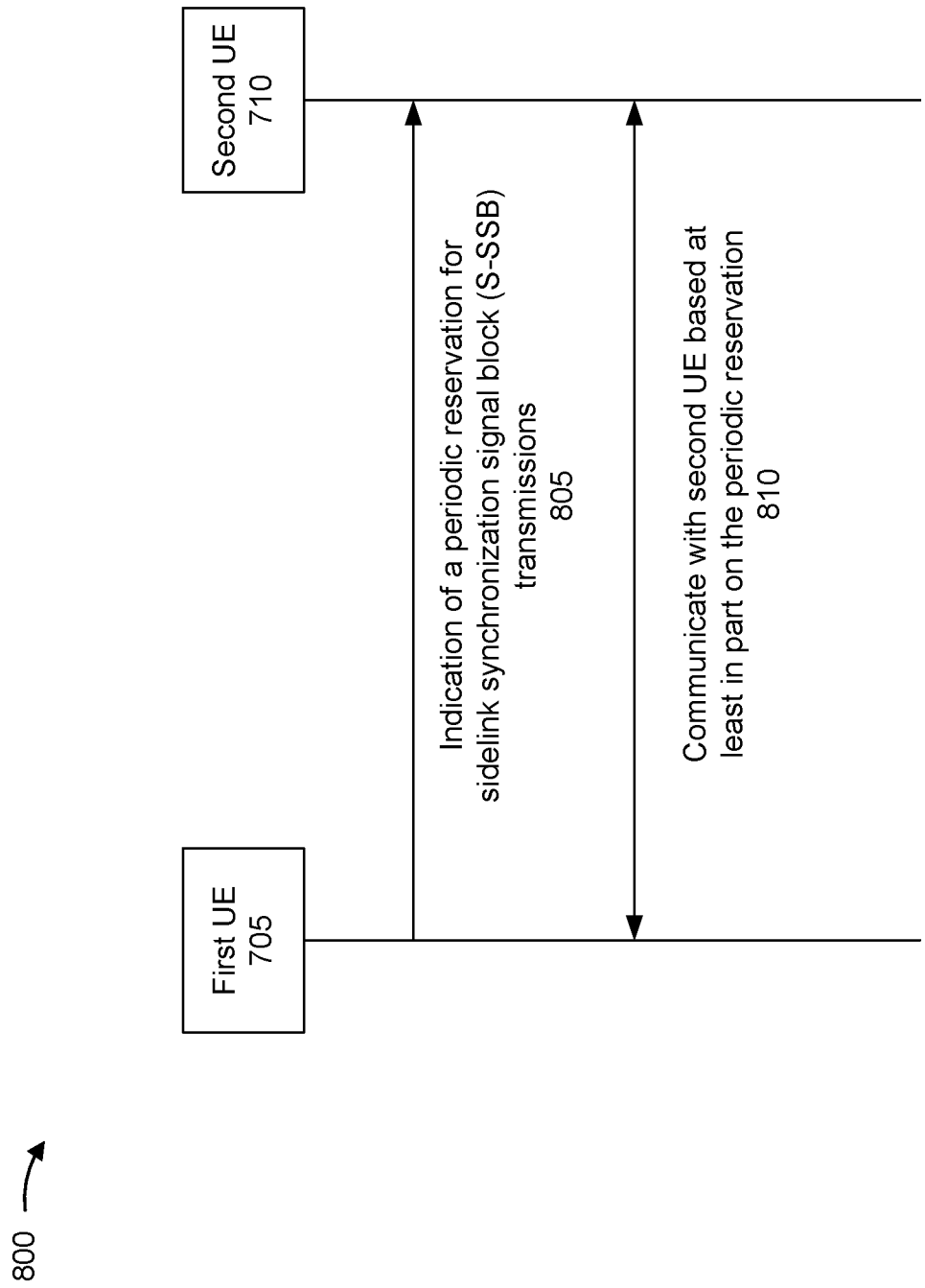
FIG. 8 is a diagram illustrating an example associated with S-SSB reservation, in accordance with the present disclosure.

FIG. 8 is a diagram illustrating an example 800 of S-SSB reservation, in accordance with the present disclosure.

As shown in connection with reference number 805, the first UE 705 may transmit, and the second UE 710 may receive, an indication of a periodic reservation for S-SSB transmissions.

In some aspects, as described in Release 16 of the 3GPP standards, the transmission of the SSB may enable a reservation of up to two additional SSB transmissions within the next 32 slots. The reservation may be carried in a time domain resource allocation (TDRA) field of an SCI-1 communication. In some aspects, a periodic reservation using the SCI-1 may be used to reserve one or more SSBs within a certain number of milliseconds of the SSB transmission. In this example, a periodic pattern may be used.

In some aspects, the SSB reservation mechanisms described in the paragraph above may be used for S-SSB reservations. For example, the transmission of the S-SSB may enable a reservation of up to two additional S-SSB transmissions within the next 32 slots. Additionally, or alternatively, the periodic reservation may be used to reserve one or more S-SSBs within a certain number of milliseconds.

In some aspects, the SCI-1 for the periodic reservations may contain the S-SSB transmission indicator. The SCI-1 S-SSB indicator may be used to interpret the TDRA field and/or the periodic reservation field of the PSSCH. For example, the period for the S-SSB transmissions may be the 160 ms period described above for the SSB transmissions, or may be a different period, such as a period that is better suited for the S-SSB transmissions. In some aspects, the TDRA field may be interpreted to indicate the next slot that will contain the S-SSB in the same period to accommodate the S-SSB repetitions. In some aspects, the SCI-1 may indicate the highest priority (e.g., the highest Layer 1 priority) for the S-SSB transmissions and S-SSB reservations.

Additional details regarding the S-SSB reservations are described below in connection with FIG. 10.

As shown in connection with reference number 810, the first UE 705 and the second UE 710 may communicate based at least in part on the S-SSB reservation. For example, the first UE 705 may reserve one or more communication resources using the S-SSB reservation. The second UE 710 may detect the S-SSB that indicates the reservation of the one or more communication resources. The first UE 705 and the second UE 710 may communicate using the reserved resources.

As described above, detection of the S-SSB may be an important step for the second UE 710 to discover the first UE 705. If the S-SSB is not given a high priority and protection, the second UE 710 may be less likely to detect the S-SSB signal and may therefore be less likely to discover the first UE 705. Using the techniques and apparatuses described herein, the S-SSB may be given a high priority and protection in order to improve sidelink communications. This may be particularly beneficial if all of the nodes (e.g., UEs) in the system are using the same RAT that has the capability to understand and honor the S-SSB reservations.

As indicated above, FIG. 8 is provided as an example. Other examples may differ from what is described with regard to FIG. 8.

Figure 9:
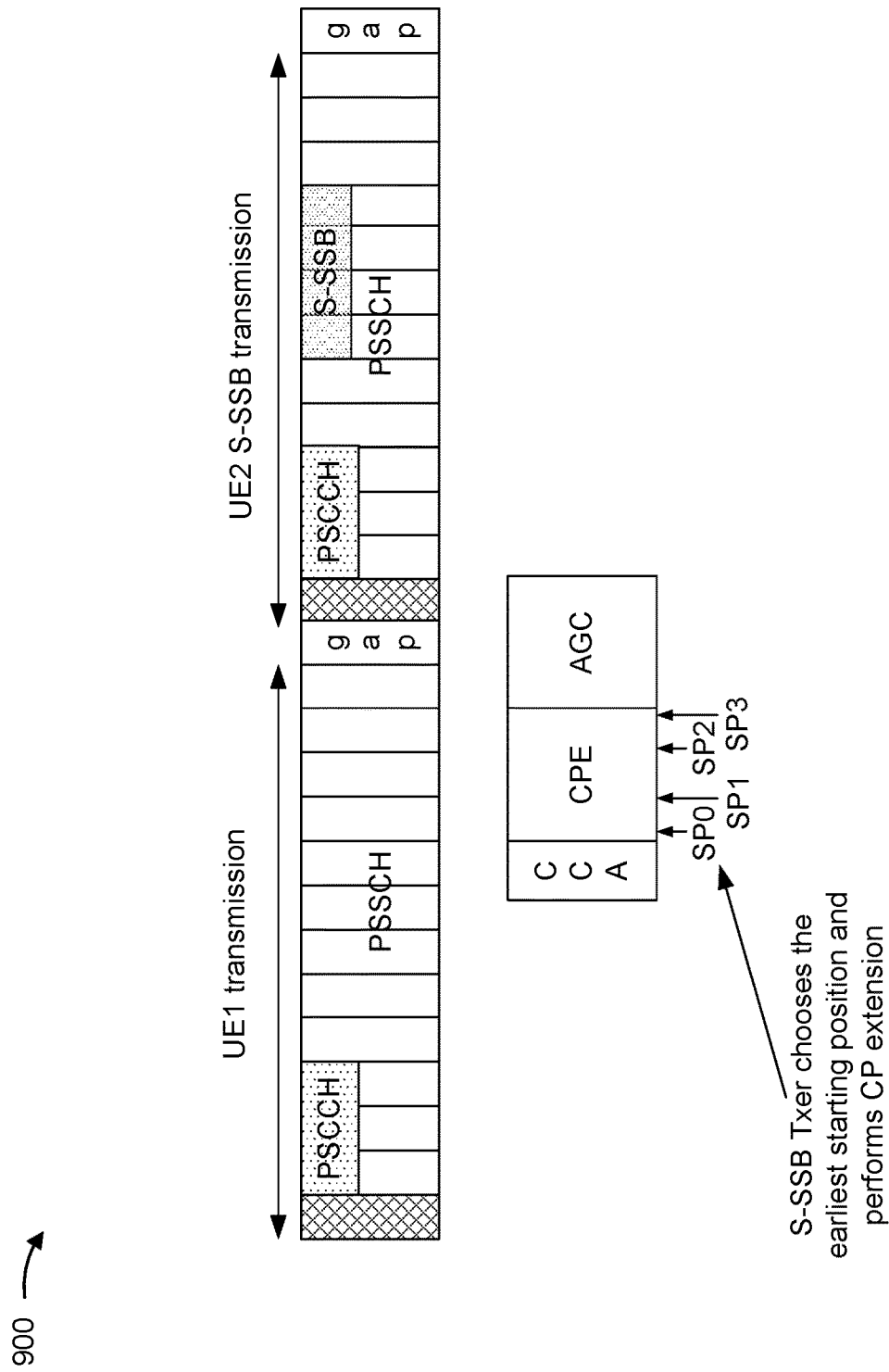
FIG. 9 is a diagram illustrating an example associated with S-SSB priority using a cyclic prefix extension, in accordance with the present disclosure.

FIG. 9 is a diagram illustrating an example 900 of S-SSB priority using cyclic prefix extension, in accordance with the present disclosure.

As described above, a cyclic prefix extension may be used before the PSSCH and PSCCH transmission. When the cyclic prefix extension is used, the PSCCH that carries the S-SSB may be able to use (e.g., occupy) the earliest contention slot or offset of the PSSCH. Thus, the UE 120 may have the opportunity to access the channel earlier (e.g., prior to other nodes) and to block communications by other nodes that selected later starting points.

In some aspects, a first UE 120 (UE1) may transmit a first PSSCH having a PSCCH, and a second UE 120 (UE2) may transmit a second PSSCH having a PSCCH and an S-SSB. A gap may be located between the first PSSCH and the second PSSCH. The gap may occupy one or two slots. The gap may include a CCA field, a cyclic prefix extension (CPE) field, and an AGC field. As shown in the example 900, a plurality of reservations (e.g., semi-persistent (SP) reservations) may be indicated in the CPE. For example, a first reservation SP0, a second reservation SP1, a third reservation SP2, and a fourth reservation SP3 may be indicated in the CPE field. In some aspects, the S-SSB transmitter (e.g., UE2) may choose the earliest starting position and perform the CP extension. For example, UE2 may choose SP0 as the starting position and perform the CP extension.

In some aspects, before the S-SSB slot and with the gap in the previous slot, the UE1 may configure multiple starting positions with different CPE lengths. For example, the UE 1 may configure multiple starting positions with CPE lengths, such as 0 microseconds (μs), 9 μs, 18 μs, or 27 μs. In this example, the S-SSB transmission may use the earliest starting position and may transmit the CP extension for the AGC symbol.

As indicated above, FIG. 9 is provided as an example. Other examples may differ from what is described with regard to FIG. 9.

Figure 10:
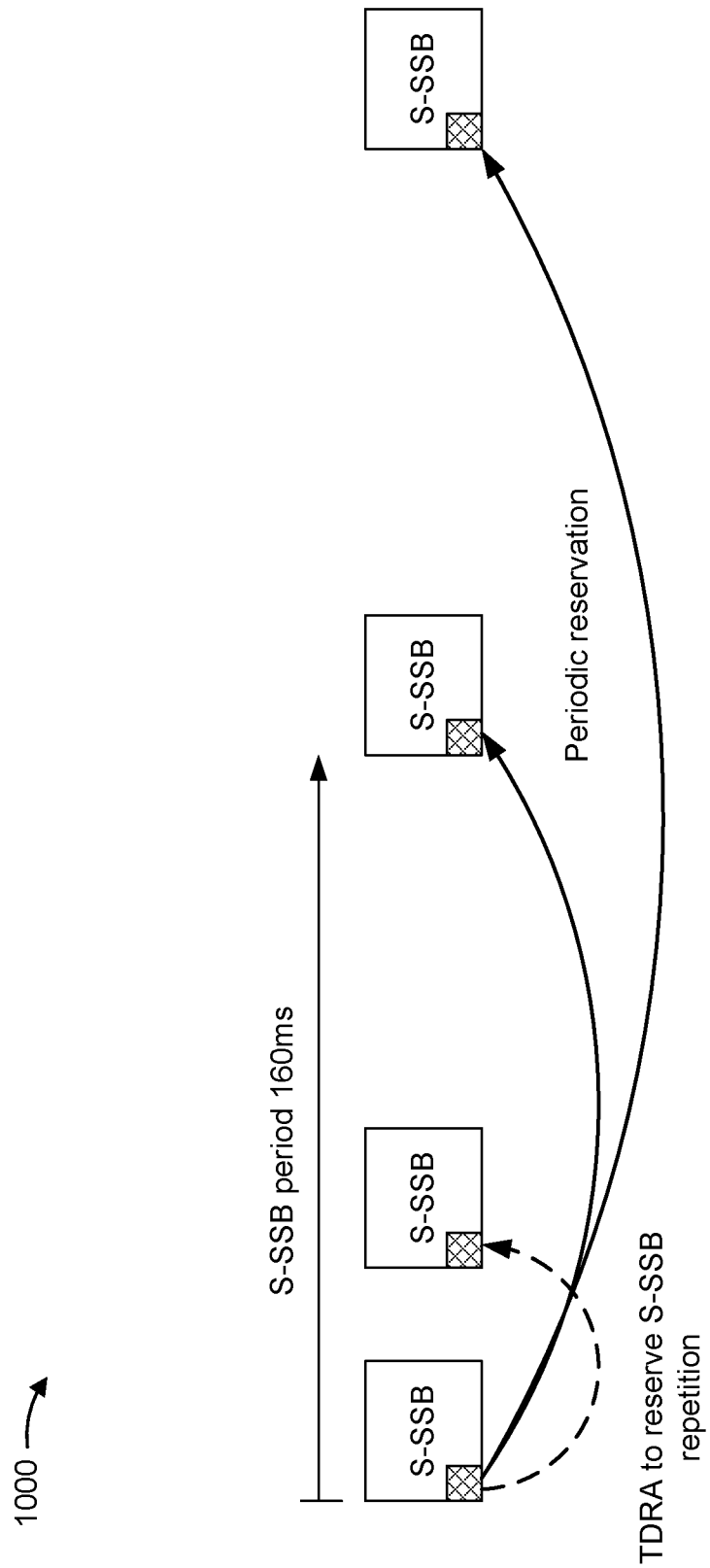
FIG. 10 is a diagram illustrating an example associated with S-SSB reservation using a time domain resource allocation (TDRA) field, in accordance with the present disclosure.

FIG. 10 is a diagram illustrating an example 1000 of S-SSB reservation using a TDRA field, in accordance with the present disclosure.

As described above, the SCI-1 for the periodic reservations may contain the S-SSB transmission indicator. The SCI-1 S-SSB indicator may be used to interpret the TDRA field and/or the periodic reservation field of the PSSCH. For example, the period for the S-SSB transmissions may be the 160 ms period described above for the SSB transmissions, or may be a different period, such as a period that is better suited for the S-SSB transmissions. In some aspects, the TDRA field may be interpreted to indicate the next slot that will contain the S-SSB in the same period to accommodate the S-SSB repetitions. As shown in the example 1000, the TDRA field of the first S-SSB may be used to reserve the S-SSB repetition in the TDRA field of the second S-SSB. Additionally, or alternatively, the TDRA fields may be used for periodic reservations of one or more other S-SSBs (e.g., for the third S-SSB and/or the fourth S-SSB).

As indicated above, FIG. 10 is provided as an example. Other examples may differ from what is described with regard to FIG. 10.

Figure 11:
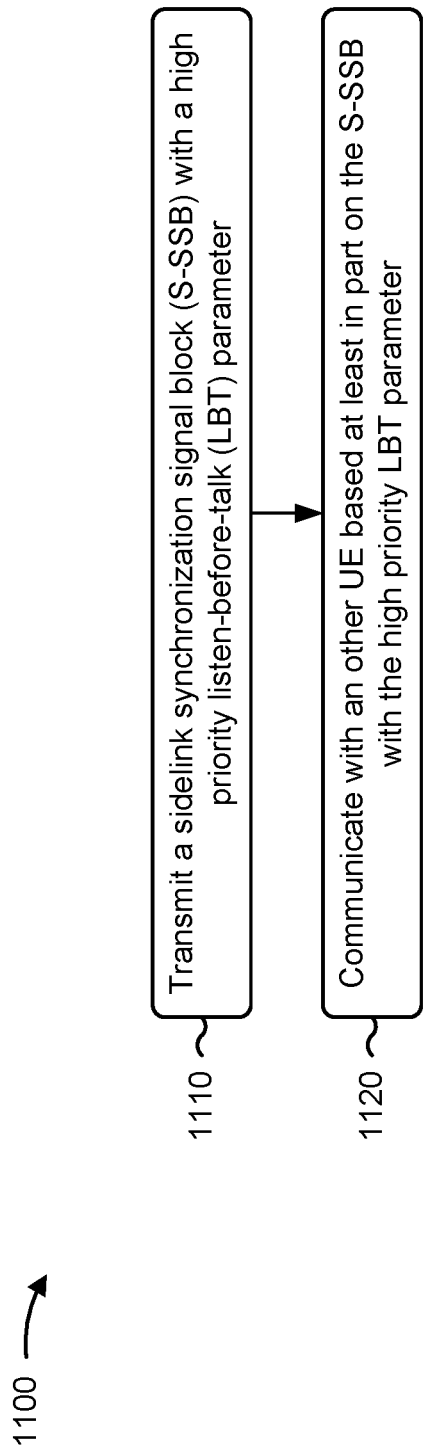
FIG. 11 is a diagram illustrating an example process associated with S-SSB priority, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with S-SSB priority.

As shown in FIG. 11, in some aspects, process 1100 may include transmitting an S-SSB with a high priority LBT parameter (block 1110). For example, the UE (e.g., using communication manager 140 and/or transmission component 1304, depicted in FIG. 13) may transmit an S-SSB with a high priority LBT parameter, as described above.

As further shown in FIG. 11, in some aspects, process 1100 may include communicating with an other UE based at least in part on the S-SSB with the high priority LBT parameter (block 1120). For example, the UE (e.g., using communication manager 140, reception component 1302 and/or transmission component 1304, depicted in FIG. 13) may communicate with an other UE based at least in part on the S-SSB with the high priority LBT parameter, as described above.

Process 1100 may include additional aspects, such as any single aspect or any combination of aspects described below and/or in connection with one or more other processes described elsewhere herein.

In a first aspect, the priority of the high priority LBT parameter is associated with a highest priority of a physical sidelink shared channel that carries the S-SSB.

In a second aspect, alone or in combination with the first aspect, the priority of the high priority LBT parameter is higher than a highest priority of a physical sidelink shared channel that carries the S-SSB.

In a third aspect, alone or in combination with one or more of the first and second aspects, transmitting the S-SSB with the high priority LBT parameter comprises transmitting the S-SSB using a category one LBT.

In a fourth aspect, alone or in combination with one or more of the first through third aspects, transmitting the S-SSB with the high priority LBT parameter comprises transmitting the S-SSB using a category two LBT.

In a fifth aspect, alone or in combination with one or more of the first through fourth aspects, transmitting the S-SSB using the category two LBT comprises transmitting the S-SSB using the category two LBT having a duty cycle that is less than 1/20.

In a sixth aspect, alone or in combination with one or more of the first through fifth aspects, transmitting the S-SSB with the high priority LBT parameter comprises transmitting the S-SSB using a category four LBT.

In a seventh aspect, alone or in combination with one or more of the first through sixth aspects, transmitting S-SSB using the category four LBT comprises transmitting the S-SSB in a smallest contention window of the category four LBT.

In an eighth aspect, alone or in combination with one or more of the first through seventh aspects, transmitting the S-SSB with the high priority LBT parameter comprises transmitting the S-SSB with a highest CAPC for S-SSB transmissions.

In a ninth aspect, alone or in combination with one or more of the first through eighth aspects, transmitting the S-SSB with the high priority LBT parameter comprises transmitting the S-SSB in a PSCCH that uses an earliest contention slot or offset of a PSSCH.

In a tenth aspect, alone or in combination with one or more of the first through ninth aspects, transmitting the S-SSB in the PSCCH that uses the earliest contention slot or offset of the PSSCH comprises transmitting the S-SSB in the PSCCH that uses the earliest contention slot or offset of the PSSCH based at least in part on a cyclic prefix extension preceding the PSSCH.

In an eleventh aspect, alone or in combination with one or more of the first through tenth aspects, process 1100 includes determining a plurality of starting positions with different cyclic prefix extension lengths for transmitting the S-SSB.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
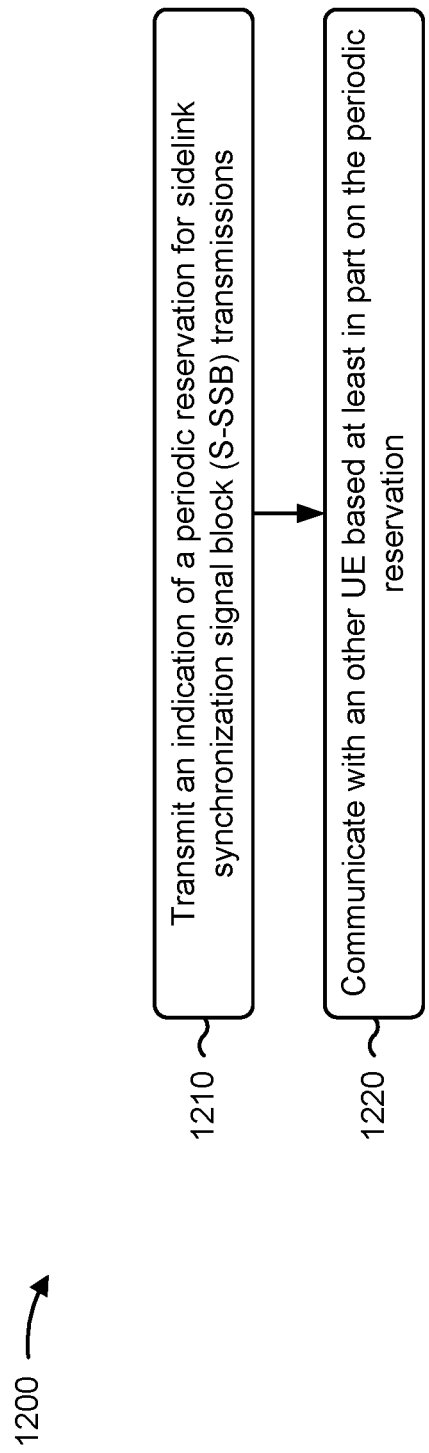
FIG. 12 is a diagram illustrating an example process associated with S-SSB reservation, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with S-SSB priority.

As shown in FIG. 12, in some aspects, process 1200 may include transmitting an indication of a periodic reservation for S-SSB transmissions (block 1210). For example, the UE (e.g., using communication manager 140 and/or transmission component 1304, depicted in FIG. 13) may transmit an indication of a periodic reservation for S-SSB transmissions, as described above.

As further shown in FIG. 12, in some aspects, process 1200 may include communicating with an other UE based at least in part on the periodic reservation (block 1220). For example, the UE (e.g., using communication manager 140, reception component 1302 and/or transmission component 1304, depicted in FIG. 13) may communicate with an other UE based at least in part on the periodic reservation, as described above.

Process 1200 may include additional aspects, such as any single aspect or any combination of aspects described below and/or in connection with one or more other processes described elsewhere herein.

In a first aspect, the indication of the periodic reservation for the S-SSB transmissions indicates a highest priority in a PSSCH for the S-SSB transmissions.

In a second aspect, alone or in combination with the first aspect, transmitting the indication of the periodic reservation for the S-SSB transmissions comprises transmitting a sidelink communication that indicates the periodic reservation for the S-SSB transmissions.

In a third aspect, alone or in combination with one or more of the first and second aspects, the sidelink communication is a first stage sidelink communication.

In a fourth aspect, alone or in combination with one or more of the first through third aspects, the indication of the periodic reservation for the S-SSB transmissions is configured for interpreting a time domain resource allocation field or a periodic reservation field of a physical sidelink shared channel for the S-SSB transmissions.

In a fifth aspect, alone or in combination with one or more of the first through fourth aspects, the indication of the periodic reservation for the S-SSB transmissions indicates a highest Layer 1 priority for the S-SSB transmissions.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
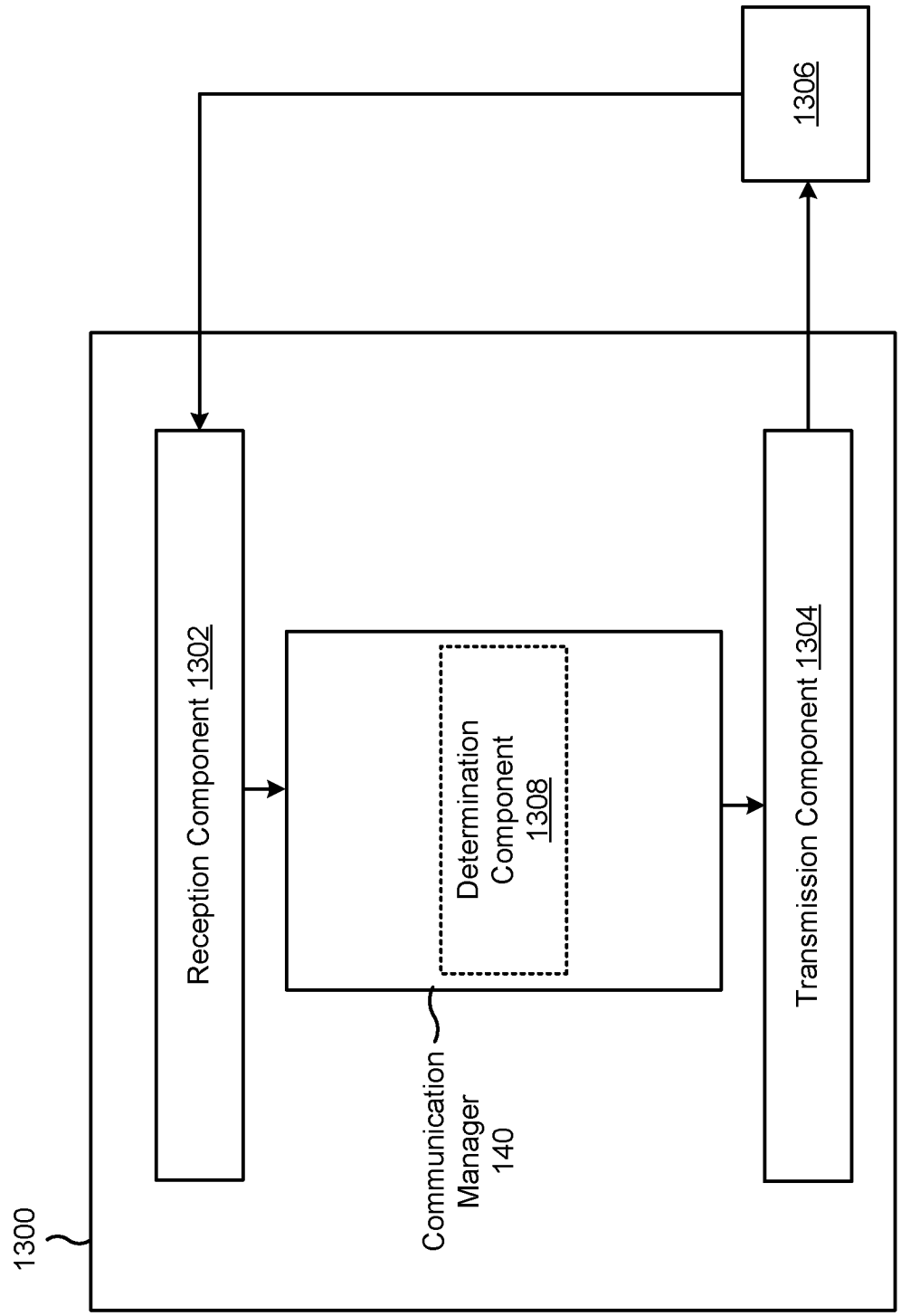
FIG. 13 is a diagram of an example apparatus for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include a determination component 1308, among other examples.

In some aspects, the apparatus 1300 may be configured to perform one or more operations described herein in connection with FIGS. 7-10. Additionally, or alternatively, the apparatus 1300 may be configured to perform one or more processes described herein, such as process 1100 of FIG. 11, process 1200 of FIG. 12, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The transmission component 1304 may transmit an S-SSB with a high priority LBT parameter. The reception component 1302 and/or the transmission component 1304 may communicate with an other UE based at least in part on the S-SSB with the high priority LBT parameter.

The determination component 1308 may determine a plurality of starting positions with different cyclic prefix extension lengths for transmitting the S-SSB.

The transmission component 1304 may transmit an indication of a periodic reservation for S-SSB transmissions. The reception component 1302 and/or the transmission component 1304 may communicate with an other UE based at least in part on the periodic reservation.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: transmitting a sidelink synchronization signal block (S-SSB) with a high priority listen-before-talk (LBT) parameter; and communicating with an other UE based at least in part on the S-SSB with the high priority LBT parameter.

Aspect 2: The method of Aspect 1, wherein the priority of the high priority LBT parameter is associated with a highest priority of a physical sidelink shared channel that carries the S-SSB.

Aspect 3: The method of any of Aspects 1-2, wherein the priority of the high priority LBT parameter is higher than a highest priority of a physical sidelink shared channel that carries the S-SSB.

Aspect 4: The method of any of Aspects 1-3, wherein transmitting the S-SSB with the high priority LBT parameter comprises: transmitting the S-SSB using a category one LBT.

Aspect 5: The method of any of Aspects 1-3, wherein transmitting the S-SSB with the high priority LBT parameter comprises: transmitting the S-SSB using a category two LBT.

Aspect 6: The method of Aspect 5, wherein transmitting the S-SSB using the category two LBT comprises: transmitting the S-SSB using the category two LBT having a duty cycle that is less than 1/20.

Aspect 7: The method of any of Aspects 1-3, wherein transmitting the S-SSB with the high priority LBT parameter comprises: transmitting the S-SSB using a category four LBT.

Aspect 8: The method of Aspect 7, wherein transmitting S-SSB using the category four LBT comprises: transmitting the S-SSB in a smallest contention window of the category four LBT.

Aspect 9: The method of any of Aspects 1-3, wherein transmitting the S-SSB with the high priority LBT parameter comprises: transmitting the S-SSB with a highest channel access priority class (CAPC) for S-SSB transmissions.

Aspect 10: The method of any of Aspects 1-9, wherein transmitting the S-SSB with the high priority LBT parameter comprises: transmitting the S-SSB in a physical sidelink control channel (PSCCH) that uses an earliest contention slot or offset of a physical sidelink shared channel (PSSCH).

Aspect 11: The method of Aspect 10, wherein transmitting the S-SSB in the PSCCH that uses the earliest contention slot or offset of the PSSCH comprises: transmitting the S-SSB in the PSCCH that uses the earliest contention slot or offset of the PSSCH based at least in part on a cyclic prefix extension preceding the PSSCH.

Aspect 12: The method of Aspect 11, further comprising determining a plurality of starting positions with different cyclic prefix extension lengths for transmitting the S-SSB.

Aspect 13: A method of wireless communication performed by a user equipment (UE), comprising: transmitting an indication of a periodic reservation for sidelink synchronization signal block (S-SSB) transmissions; and communicating with an other UE based at least in part on the periodic reservation.

Aspect 14: The method of Aspect 13, wherein the indication of the periodic reservation for the S-SSB transmissions indicates a highest priority in a physical sidelink shared channel (PSSCH) for the S-SSB transmissions.

Aspect 15: The method of any of Aspects 13-14, wherein transmitting the indication of the periodic reservation for the S-SSB transmissions comprises: transmitting a sidelink communication that indicates the periodic reservation for the S-SSB transmissions.

Aspect 16: The method of Aspect 15, wherein the sidelink communication is a first stage sidelink communication.

Aspect 17: The method of any of Aspects 13-16, wherein the indication of the periodic reservation for the S-SSB transmissions is configured for interpreting a time domain resource allocation field or a periodic reservation field of a physical sidelink shared channel for the S-SSB transmissions.

Aspect 18: The method of any of Aspects 13-17, wherein the indication of the periodic reservation for the S-SSB transmissions indicates a highest Layer 1 priority for the S-SSB transmissions.

Aspect 19: An apparatus for wireless communication at a device, comprising a processor; memory coupled with the processor; and instructions stored in the memory and executable by the processor to cause the apparatus to perform the method of one or more of Aspects 1-12.

Aspect 20: A device for wireless communication, comprising a memory and one or more processors coupled to the memory, the one or more processors configured to perform the method of one or more of Aspects 1-12.

Aspect 21: An apparatus for wireless communication, comprising at least one means for performing the method of one or more of Aspects 1-12.

Aspect 22: A non-transitory computer-readable medium storing code for wireless communication, the code comprising instructions executable by a processor to perform the method of one or more of Aspects 1-12.

Aspect 23: A non-transitory computer-readable medium storing a set of instructions for wireless communication, the set of instructions comprising one or more instructions that, when executed by one or more processors of a device, cause the device to perform the method of one or more of Aspects 1-12.

Aspect 24: An apparatus for wireless communication at a device, comprising a processor; memory coupled with the processor; and instructions stored in the memory and executable by the processor to cause the apparatus to perform the method of one or more of Aspects 13-18.

Aspect 25: A device for wireless communication, comprising a memory and one or more processors coupled to the memory, the one or more processors configured to perform the method of one or more of Aspects 13-18.

Aspect 26: An apparatus for wireless communication, comprising at least one means for performing the method of one or more of Aspects 13-18.

Aspect 27: A non-transitory computer-readable medium storing code for wireless communication, the code comprising instructions executable by a processor to perform the method of one or more of Aspects 13-18.

Aspect 28: A non-transitory computer-readable medium storing a set of instructions for wireless communication, the set of instructions comprising one or more instructions that, when executed by one or more processors of a device, cause the device to perform the method of one or more of Aspects 13-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, the one or more processors individually or collectively configured to:
transmit a sidelink synchronization signal block (S-SSB) to an other UE, wherein the S-SSB corresponds to a high priority listen-before-talk (LBT) parameter, wherein a priority of the high priority LBT parameter is associated with a highest priority of a physical sidelink shared channel (PSSCH) that carries the S-SSB; and
communicate with the other UE based at least in part on the S-SSB with the high priority LBT parameter.

2. The apparatus of claim 1, wherein the priority of the high priority LBT parameter is higher than Hall the highest priority of the PSSCH.

3. The apparatus of claim 1, wherein the one or more processors, to transmit the S-SSB with the high priority LBT parameter, are configured to:
transmit the S-SSB using a category one LBT.

4. The apparatus of claim 1, wherein the one or more processors, to transmit the S-SSB with the high priority LBT parameter, are configured to:
transmit the S-SSB using a category two LBT.

5. The apparatus of claim 4, wherein the one or more processors, to transmit the S-SSB using the category two LBT, are configured to:
transmit the S-SSB using the category two LBT having a duty cycle that is less than 1/20.

6. The apparatus of claim 1, wherein the one or more processors, to transmit the S-SSB with the high priority LBT parameter, are configured to:
transmit the S-SSB using a category four LBT.

7. The apparatus of claim 6, wherein the one or more processors, to transmit the S-SSB using the category four LBT, are configured to:
transmit the S-SSB in a smallest contention window of the category four LBT.

8. The apparatus of claim 1, wherein the one or more processors, to transmit the S-SSB with the high priority LBT parameter, are configured to:
transmit the S-SSB with a highest channel access priority class (CAPC) for S-SSB transmissions.

9. The apparatus of claim 1, wherein the one or more processors, to transmit the S-SSB with the high priority LBT parameter, are configured to:
transmit the S-SSB in a physical sidelink control channel (PSCCH) that uses an earliest contention slot or offset of the PSSCH.

10. The apparatus of claim 9, wherein the one or more processors, to transmit the S-SSB in the PSCCH that uses the earliest contention slot or offset of the PSSCH, are configured to:
transmit the S-SSB in the PSCCH that uses the earliest contention slot or offset of the PSSCH based at least in part on a cyclic prefix extension preceding the PSSCH.

11. The apparatus of claim 10, wherein the one or more processors are further configured to determine a plurality of starting positions with different cyclic prefix extension lengths for transmitting the S-SSB.

12. The apparatus of claim 1, wherein the priority of the high priority LBT parameter is the highest priority of the PSSCH that carries the S-SSB.

13. An apparatus for wireless communication at a user equipment (UE), comprising:
one or more memories; and
one or more processors, coupled to the one or more memories, the one or more processors individually or collectively configured to:
transmit an indication of a periodic reservation for sidelink synchronization signal block (S-SSB) transmissions, wherein the indication of the periodic reservation for the S-SSB transmissions indicates a highest priority in a physical sidelink shared channel (PSSCH) for the S-SSB transmissions; and
communicate with an other UE based at least in part on the periodic reservation.

14. The apparatus of claim 13, wherein the one or more processors, to transmit the indication of the periodic reservation for the S-SSB transmissions, are configured to:
transmit a sidelink communication that indicates the periodic reservation for the S-SSB transmissions.

15. The apparatus of claim 14, wherein the sidelink communication is a first stage sidelink communication.

16. The apparatus of claim 13, wherein the indication of the periodic reservation for the S-SSB transmissions is configured for interpreting a time domain resource allocation field or a periodic reservation field of the PSSCH for the S-SSB transmissions.

17. The apparatus of claim 13, wherein the indication of the periodic reservation for the S-SSB transmissions indicates a highest Layer 1 priority for the S-SSB transmissions.

18. The apparatus of claim 13, wherein the indication of the periodic reservation for the S-SSB transmissions indicates a highest Layer 1 priority for the S-SSB transmissions.

19. A method of wireless communication performed by a user equipment (UE), comprising:
transmitting a sidelink synchronization signal block (S-SSB) to an other UE, wherein the S-SSB corresponds to a high priority listen-before-talk (LBT) parameter, wherein a priority of the high priority LBT parameter is based at least in part on a highest priority of a physical sidelink shared channel (PSSCH) that carries the S-SSB; and
communicating with the other UE based at least in part on the S-SSB with the high priority LBT parameter.

20. The method of claim 19, wherein the priority of the high priority LBT parameter is higher than the highest priority of the PSSCH that carries the S-SSB.

21. The method of claim 19, wherein transmitting the S-SSB with the high priority LBT parameter comprises: transmitting the S-SSB using a category one LBT.

22. The method of claim 19, wherein transmitting the S-SSB with the high priority LBT parameter comprises: transmitting the S-SSB using a category two LBT.

23. The method of claim 19, wherein transmitting the S-SSB with the high priority LBT parameter comprises: transmitting the S-SSB using a category four LBT.

24. The method of claim 19, wherein transmitting the S-SSB with the high priority LBT parameter comprises: transmitting the S-SSB with a highest channel access priority class (CAPC) for S-SSB transmissions.

25. The method of claim 19, wherein transmitting the S-SSB with the high priority LBT parameter comprises: transmitting the S-SSB in a physical sidelink control channel (PSCCH) that uses an earliest contention slot or offset of the PSSCH.

26. The method of claim 19, wherein the priority of the high priority LBT parameter is the highest priority of the PSSCH that carries the S-SSB.

27. A method of wireless communication performed by a user equipment (UE), comprising:

transmitting an indication of a periodic reservation for sidelink synchronization signal block (S-SSB) transmissions, wherein the indication of the periodic reservation for the S-SSB transmissions indicates a highest priority in a physical sidelink shared channel (P S S CH) for the S-SSB transmissions; and communicating with an other UE based at least in part on the periodic reservation.

28. The method of claim 27, wherein transmitting the indication of the periodic reservation for the S-SSB transmissions comprises:

transmitting a sidelink communication that indicates the periodic reservation for the S-SSB transmissions.

29. The method of claim 28, wherein the sidelink communication is a first stage sidelink communication.

30. The method of claim 27, wherein the indication of the periodic reservation for the S-SSB transmissions is configured for interpreting a time domain resource allocation field or a periodic reservation field of the PSSCH for the S-SSB transmissions.

* * * * *